(12) United States Patent
Ko et al.

(10) Patent No.: US 8,163,359 B2
(45) Date of Patent: Apr. 24, 2012

(54) RETARDATION FILM, AND POLARIZING PLATE AND LIQUID CRYSTAL DISPLAY COMPRISING THE SAME

(75) Inventors: Minjin Ko, Daejeon (KR); Myungsun Moon, Daejeon (KR); Kiyoul Lee, Daejeon (KR); Kim YunBong, Daejeon (KR); Jaeho Cheong, Daejeon (KR); Bumgyu Choi, Daejeon (KR); Daeho Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 674 days.

(21) Appl. No.: 12/318,315

(22) Filed: Dec. 24, 2008

(65) Prior Publication Data

US 2009/0169774 A1 Jul. 2, 2009

(30) Foreign Application Priority Data

Dec. 26, 2007 (KR) .............................. 2007-0137976

(51) Int. Cl.
*C09K 19/00* (2006.01)

(52) U.S. Cl. ....... 428/1.32; 428/1.3; 428/1.31; 349/117; 349/119; 359/489.02; 359/489.07; 556/432; 556/438

(58) Field of Classification Search ................... 428/1.3, 428/1.31, 1.32; 349/75, 86, 87, 94, 96, 117, 349/118, 119, 120, 121; 359/485.03, 487.01, 359/489.02, 489.07; 252/585; 556/432, 556/438, 445
See application file for complete search history.

(56) References Cited

U.S. PATENT DOCUMENTS

| 2007/0114492 A1 | 5/2007 | Cheong et al. |
| 2007/0172605 A1* | 7/2007 | Ohtani et al. ................ 428/1.31 |

FOREIGN PATENT DOCUMENTS

| KR | 10-2006-0049305 | 5/2006 |
| KR | 10-0778637 | 11/2007 |

* cited by examiner

*Primary Examiner* — Angela Ortiz
*Assistant Examiner* — Ruiyun Zhang
(74) *Attorney, Agent, or Firm* — McKenna Long & Aldridge LLP

(57) ABSTRACT

Disclosed are a retardation film including a polymer resin; and an optically anisotropic compound having a silicon group, and a polarizing plate including the retardation film. Also, disclosed is a liquid crystal display including the retardation film and/or the polarizing plate.

19 Claims, No Drawings

RETARDATION FILM, AND POLARIZING PLATE AND LIQUID CRYSTAL DISPLAY COMPRISING THE SAME

This application claims the benefit of the filing date of Korean Patent Application No. 10-2007-0137976, filed on Dec. 26, 2007, in the Korean Intellectual Property Office, the disclosure of which is incorporated herein in its entirety by reference.

BACKGROUND OF THE INVENTION (a) Field of the Invention

The present invention relates to a retardation film including: a polymer resin; and an optically anisotropic compound having a silicon group, and a polarizing plate including the retardation film. The present invention also relates to a liquid crystal display including the retardation film and/or the polarizing plate.

(b) Description of the Related Art

As a sharper image has been required with the recent expansion of the display market, an optical material having an advanced optical characteristic, instead of a simple transparent material, has been required. Especially, since a liquid crystal display (LCD) used for notebooks, monitors, and TVs, as compared to a CRT (cathode-ray tube) and a PDP, has a poor viewing angle characteristic, various investigations for making up such a characteristic have been conducted.

As one method of improving a viewing angle characteristic, there is a method of employing, as a retardation film, a stretched film obtained through uniaxial stretching or biaxial stretching of a transparent film including a polycarbonate, a cellulose resin, or a cyclic olefin-based resin.

In the case of a polycarbonate, a relatively large phase difference can be shown by stretching, but due to a high elastic modulus at light, the phase difference is subject to change according to a stretching process condition or use environment. In addition, unevenness of phase difference may occur.

Meanwhile, a cyclic olefin-based resin, or a cellulose acetate-based resin can show very high film transparency, but shows a small phase difference through a stretching process. Also, in order to obtain a large phase difference, it is necessary to stretch a film to a great extent, which may cause unevenness of phase difference.

Japanese Patent Laid-Open No. 2004-035347 has recently disclosed a method of fabricating a retardation film by introducing a needle-shaped inorganic particle to a cyclic olefin film. However, in the case of an inorganic fine particle, it is difficult to uniformly disperse the particle in a solvent due to low solubility in the solvent, and high density, and there is a possibility that the particle is subject to aggregation due to low stability, thereby reducing the transparency of a polymer film.

Also, Japanese Patent Laid-Open No. 2006-154760 disclosed a retardation film obtained by adding a low-molecular weight organic compound within a transparent polymer film, and carrying out a stretching process. However, in this invention, the organic compound has low anisotropy, and stretching of the polymer film results in only a limited phase difference. Thus, in order to obtain a required phase difference, it is necessary to stretch a film to a great extent.

Also, in general, a compound with high anisotropy has a high degree of crystallinity, low solubility in a solvent, and low compatibility within a polymer film. Thus, when mixed and processed, such a compound is deposited/phase-separated and thereby is difficult to fabricate a transparent film. However, no solution has yet been proposed.

SUMMARY OF THE INVENTION

Therefore, the present invention has been made in view of the above-mentioned problems. It is an object of the present invention to provide a retardation film including: a polymer resin; and a certain organic compound having excellent compatibility with the polymer resin and high anisotropy, and a polarizing plate including the retardation film which shows a phase difference by orienting the anisotropic material through a stretching process.

Also, the present invention provides a liquid crystal display device including the retardation film and/or the polarizing plate.

The present invention provides a retardation film including (a) a polymer resin; and (b) a silicon-containing compound represented by Formula 1.

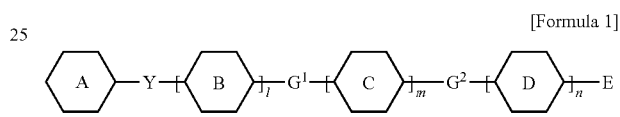
[Formula 1]

In Formula 1,

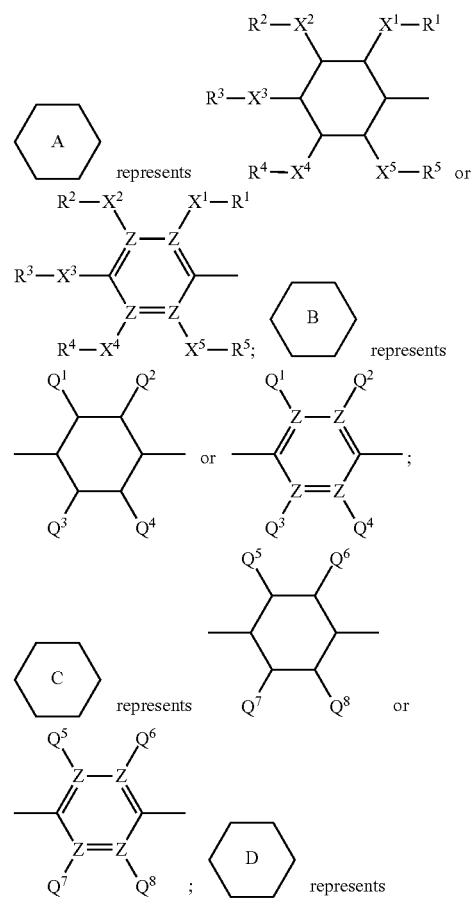

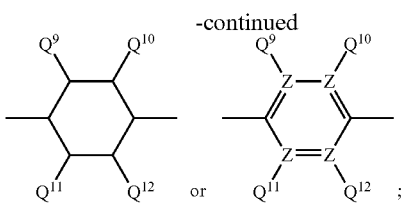

each of $Q^1$ to $Q^{12}$ independently represents —H, —F, —Cl, —Br, —I, —CN, —$CF_3$, —$OCF_3$, —$R^6$, —$OR^6$, —$NHR^6$, —$NR^6R^6$, or —$C(=O)R^6$;

Z represents C or N, and herein, there exist bonds with corresponding $Q^1$ to $Q^{12}$ with the proviso that Z≠N;

each of l, m and n independently represents an integer of 0 to 2, and l+m+n represents an integer of at least 1;

each of Y, $G^1$ and $G^2$ independently represents —$(CH_2)_r SiW^1W^2(CH_2)_s$—, —O—, —$NR^6$—, —S—, —SO—, —$SO_2$—, —$(CH_2)_q$—, —CH=CH—, —C≡C—, —$C(=O)O(CH_2)_q$—, $OC(=O)(CH_2)_q$—, —$(CH_2)_q C(=O)O$—, —$(CH_2)_q OC(=O)$—, —$C(=O)$—, —$C(=O)(CH_2)_q$—, —$(CH_2)_q C(=O)$—, —$C(=O)NR^6$—, —$NR^6C(=O)$—, —$C(=O)S$—, or —$SC(=O)$—, q represents an integer of 0 to 5, each of r and s independently represents an integer of 0 to 2;

E represents —H, —F, —Cl, —Br, —I, —CN, —NCO, —NCS, —$SiW^1W^2R^6$, —$R^6$, —$N(R^6)_2$, —OR, —$CF_3$, or —$OCF_3$;

each of $X^1$ to $X^5$ independently represents —$SiW^1W^2$—, —O—, —$NR^6$—, —S—, —SO—, —$SO_2$—, —$(CH_2)_p$—, —$C(=O)NR^6$—, —$NR^6C(=O)$—, —$NR^6C(=O)NR^6$—, —$C(=O)O$—, —$OC(=O)$—, or —$OC(=O)O$—, and p represents an integer of 0 to 2;

$W^1$ represents —$R^7$, —$OR^7$, —$NHR^7$, or —$N(R^7)_2$;

$W^2$ represents —$R^8$, —$OR^8$, —$NHR^8$, or —$N(R^8)_2$;

each of $R^1$ to $R^8$ independently represents —H, $C_1$~$C_{20}$ alkyl, $C_1$~$C_{20}$ fluoroalkyl, $C_2$~$C_{20}$ alkenyl, $C_2$~$C_{20}$ fluoroalkenyl, $C_2$~$C_{20}$ alkynyl, $C_2$~$C_{20}$ fluoroalkynyl, —$(CH_2CH_2O)_t CH_3$, —$(CH_2CHCH_3O)_t CH_3$, or —$(CHCH_3CH_2O)_t CH_3$, and t represents an integer of 1 to 5; and at least one of Y, $G^1$, $G^2$, E, and $X^1$ to $X^5$ is a Si containing substituent, and herein, as the Si containing substituent, in Y, $G^1$ and $G^2$, —$(CH_2)_r SiW^1W^2(CH_2)_s$— is introduced, in E, —$SiW^1W^2R^6$ is introduced, and in $X^1$ to $X^5$, —$SiW^1W^2$— is introduced.

Also, the present invention provides a polarizing plate including the retardation film that includes (a) a polymer resin; and (b) the silicon-containing compound represented by Formula 1.

Also, the present invention provides a liquid crystal display device including one or both of (i) the retardation film and (ii) the polarizing plate including the retardation film, wherein the retardation film includes (a) a polymer resin; and (b) the silicon-containing compound represented by Formula 1.

The retardation film of the present invention includes the compound represented by Formula 1 (the compound having a large birefringence and excellent compatibility with a polymer resin), which causes no phase-separation and makes it possible to show a large phase difference by stretching a film to only a small extent. Thus, the film according to the present invention has a uniform thickness, and little unevenness of phase difference.

DETAILED DESCRIPTION OF THE INVENTION

A retardation film of the present invention includes (a) a polymer resin; and (b) a silicon-containing compound represented by Formula 1, and herein, the compound represented by Formula 1 is preferably oriented by a stretching process.

Preferably, in the retardation film of the present invention, a intra-planar phase difference value (Re) ranges from 10 to 500 nm, and a thickness-directional phase difference value (Rth) ranges from 10 to 500 nm.

Also, the retardation film of the present invention is preferably fabricated by a stretching process, and can show a required phase difference by film-stretching to only a small extent because of orientation of the compound represented by Formula 1 (that is, a high-anisotropy compound). Also, since the compound represented by Formula 1 has high compatibility, the retardation film of the present invention has high transparency.

In the present invention, there is no limitation in (a) the polymer resin, as long as the polymer resin has high transparency.

The polymer resin may be at least one material selected from the group including an alicyclic structure-containing polymer resin, a polycarbonate resin, a polyester resin, a polysulfone resin, a polyethersulfone resin, a polyetherketone resin, a polystyrene resin, a polyolefin resin, a polyvinylalcohol resin, a polyvinyl chloride resin, a polyacryl resin, a cellulose acetate resin, a polyimide resin, a polyamide resin, a polyketonesulfide resin, a polyarylenesulfide resin, a polyaryleneether resin, a polyacetal resin, and a cellulose resin, but the present invention is not limited thereto. Especially, an alicyclic structure-containing polymer resin, a cellulose resin, and/or a polyacryl resin with a high optical characteristic are/is preferable.

The alicyclic structure-containing polymer resin has an alicyclic structure in a repeating unit thereof. Specifically, examples of the alicyclic structure-containing polymer resin include a norbornene polymer, a monocyclic cycloolefin polymer, a cyclic conjugated diene-based polymer, a vinyl alicyclic hydrocarbon polymer, and hydrides thereof, but the present invention is not limited thereto. Preferably, a norbornene polymer may be used.

Also, examples of the norbornene polymer include a ring-opening polymer of a norbornene monomer, a ring-opening copolymer of a norbornene monomer and another monomer ring-opening copolymerizable with the norbornene monomer, and hydrides thereof, an addition polymer of a norbornene monomer, an addition copolymer of a norbornene monomer and another monomer copolymerizable with the norbornene monomer, etc., but the present invention is not limited thereto. There is no limitation in the norbornene monomer, a monomer ring-opening-copolymerizable with the norbornene monomer, and a monomer addition-copolymerizable with the norbornene monomer, as long as they are conventionally known.

Also, the cellulose resin is preferably a lower fatty acid ester of cellulose. In the lower fatty acid ester of cellulose, the lower fatty acid indicates a fatty acid having at most 6 carbon atoms, for example, cellulose acetate, cellulose propionate, cellulose butyrate, etc., but the present invention is not limited thereto.

Also, the polyacryl resin is preferably excellent in transparency and optical anisotropy. The polyacryl resin is obtained by polymerizing an acrylic acid and a derivative thereof, and examples thereof include polymers or copolymers of an unsaturated carboxylic acid monomer, an unsaturated carboxylic acid alkyl ester monomer, acrylamide, acrylonitrile, etc., and acryl copolymers including the above mentioned resins, but the present invention is not limited thereto.

In the present invention, the compound represented by Formula 1 is an optically anisotropic compound having refractive anisotropy of 0.2 or more, and necessarily has at least one silicon group. In Formula 1, at least one of Y, $G^1$, $G^2$, E, and $X^1$ to $X^5$ is a Si containing substituent. Specifically, as the Si containing substituent, in Y, $G^1$ and $G^2$, —$(CH_2)_r SiW^1W^2(CH_2)_s$— is introduced, in E, —$SiW^1W^2R^6$ is introduced, and in $X^1$ to $X^5$, —$SiW^1W^2$— is introduced.

The compound represented by Formula 1 is easily mixed with various polymer resins, and has high solubility even at low temperatures. In addition, the compound is physically and chemically stable under the condition where a liquid crystal display device is usually used, and is stable under heat and light.

Also, the compound represented by Formula 1 has a high anisotropy, and high compatibility with a polymer resin for an optical film. In addition, during or after the preparation of the optical film, phase separation does not occur.

In the compound represented by Formula 1, examples of $C_1$~$C_{20}$ alkyl of $R^1$ to $R^8$ include linear or branched alkyls, such as —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)_2$, etc., but the present invention is not limited thereto. Also, in Formula 1, $C_1$~$C_{20}$ fluoroalkyl of $R^1$ to $R^8$ includes at least one fluorine group substituting for hydrogen of the alkyl group as defined above.

Also, in Formula 1, examples of $C_2$-$C_{20}$ alkenyl of $R^1$ to $R^8$ include linear or branched alkenyls, such as —$CH$=$CH_2$, —$CH$=$CHCH_3$, —$CCH_3$=$CH_2$, —$CH_2CH$=$CH_2$, —$CH$=$CHCH_2CH_3$, —$CH$=$C(CH_3)_2$, —$CCH_3$=$CHCH_3$, —$CH_2CH$=$CHCH_3$, —$CH_2CCH_3$=$CH_2$, —$CHCH_3CH$=$CH_2$, —$CH_2CH_2CH$=$CH_2$, etc., but the present invention is not limited thereto. Also, in Formula 1, $C_2$~$C_{20}$ fluoroalkenyl of $R^1$ to $R^8$ includes at least one fluorine group substituting for hydrogen of the alkenyl group as defined above. Also, in Formula 1, examples of $C_2$~$C_{20}$ alkynyl of $R^1$ to $R^8$ include linear or branched alkynyls, such as —$C$≡$CH$, —$CH_2C$≡$CH$, —$C$≡$CCCH_3$, —$CH_2CH_2C$≡$CH$, —$CHCH_3C$≡$CH$, —$CH_2C$≡$CCH_3$, —$C$≡$CCH_2CH_3$, etc., but the present invention is not limited thereto. Also, in Formula 1, $C_2$~$C_{20}$ fluoroalkynyl of $R^1$ to $R^8$ includes at least one fluorine group substituting for hydrogen of the alkynyl group as defined above.

Also, in the compound represented by Formula 1, l+m+n represents an integer equal to or greater than 1, preferably an integer of 1 to 4, and more preferably an integer of 1 to 3.

Also, in the compound represented by Formula 1, a mesogen between Y and E preferably has a structure composed of [aromatic ring]-[single bond, double bond or triple bond]-[aromatic ring], and more preferably has a structure composed of [aromatic ring]-[single bond or triple bond]-[aromatic ring].

Specific examples of the compound represented by Formula 1 are as follows, but the present invention is not limited thereto.

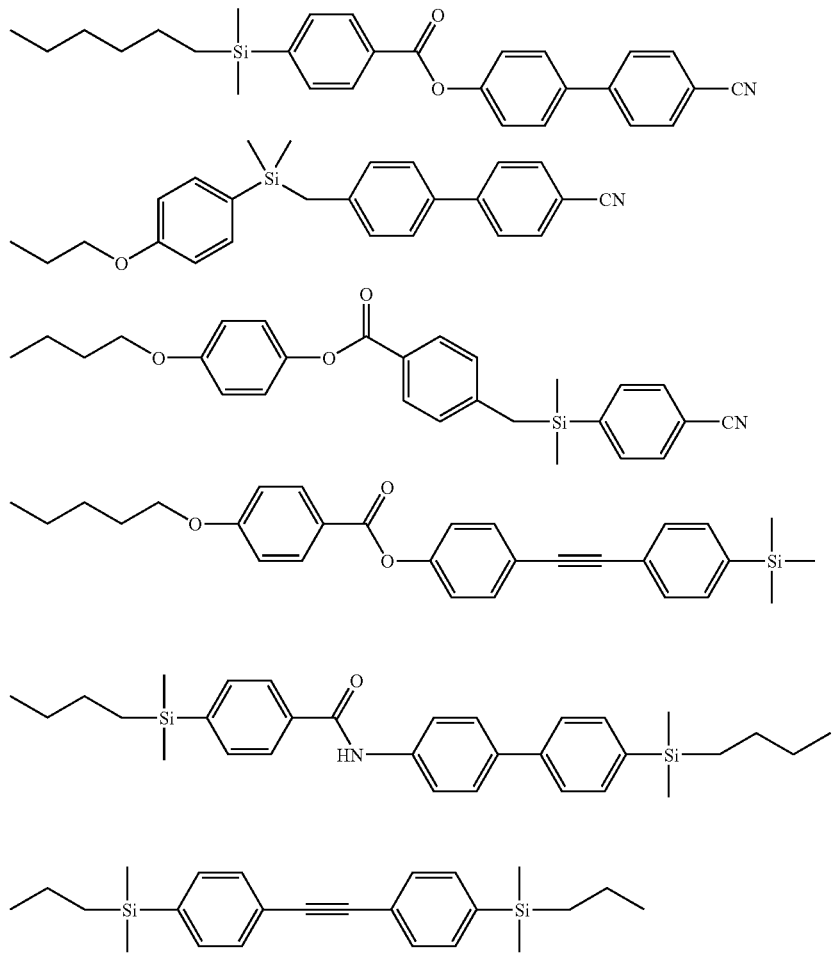

-continued

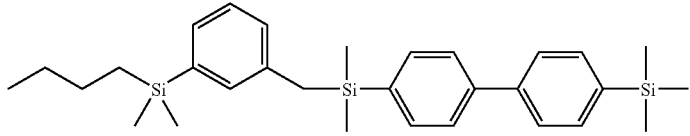

Hereinafter, the method of preparing the compound represented by Formula 1 will be described. However, the Reaction Schemes are illustrative only and do not limit the method.

The compound represented by Formula 1 may be prepared by Reaction Scheme 1.

each of $L^1$ and $L^2$ independently represents a living group, such as halide, mesylate, tosylate, or triflate.

In Reaction Scheme 1, acetylenes such as trimethylsilylacetylene and Pd catalyst may be used to prepare the tolane compound.

[Reaction Scheme 1]

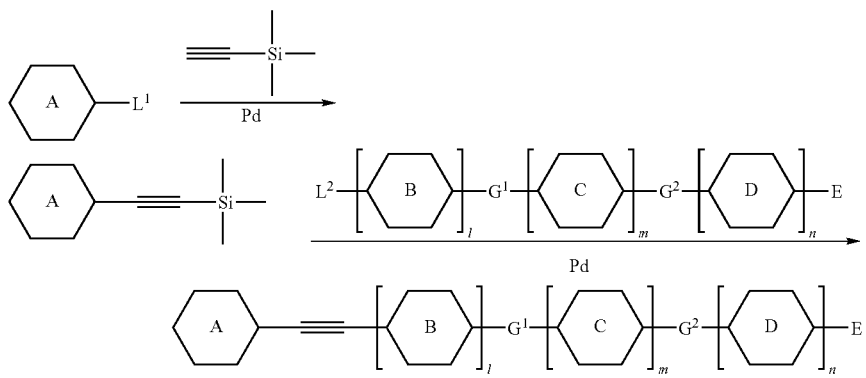

In Reaction Scheme 1, ring A, ring B, ring C, ring D, l, m, n, $G^1$, $G^2$, and E are the same as defined in Formula 1, and Also, the compound represented by Formula I may be prepared by Reaction Scheme 2.

[Reaction Scheme 2]

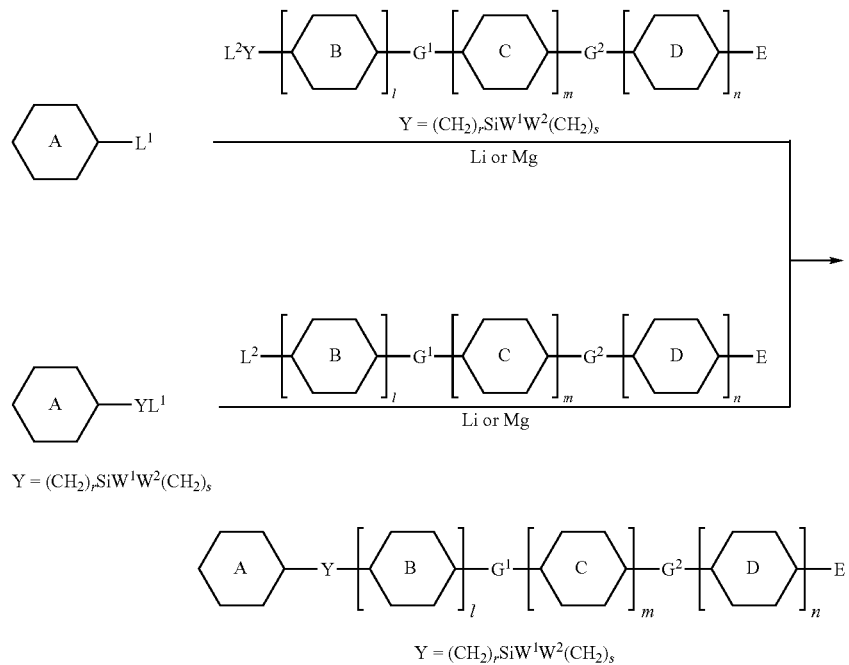

In Reaction Scheme 2, ring A, ring B, ring C, ring D, l, m, n, $W^1$, $W^2$, r, s, $G^1$, $G^2$ and E are the same as defined in Formula 1, each of $L^1$ and $L^2$ is the same as defined in Reaction Scheme 1, and Li or Mg represents a metal capable of forming anions, such as Li, n-BuLi, Mg, etc.

Also, the compound represented by Formula 1 may be prepared by Reaction Scheme 3.

[Reaction Scheme 3]

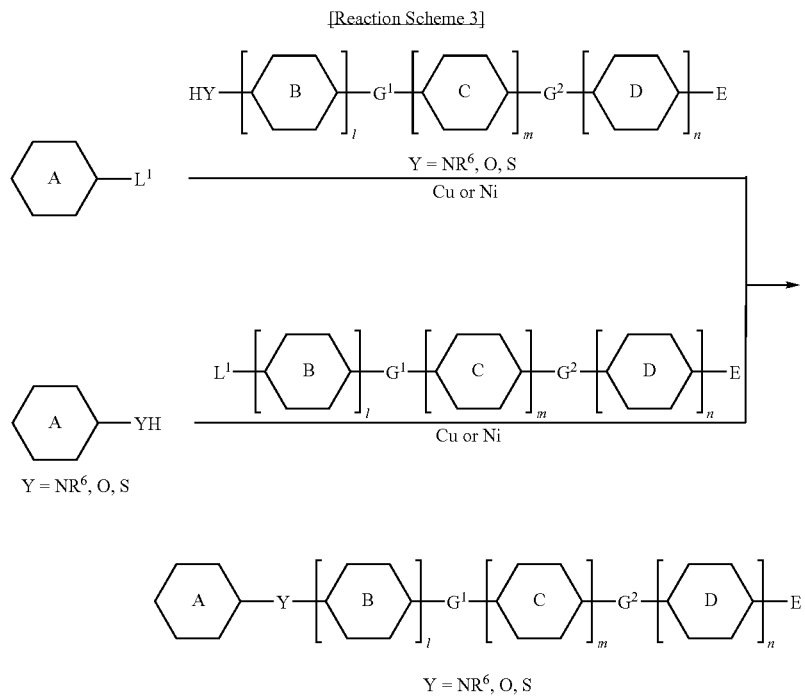

In Reaction Scheme 3, ring A, ring B, ring C, ring D, l, m, n, $G^1$, $G^2$, $R^6$ and E are the same as defined in Formula 1, and $L^1$ is the same as defined in Reaction Scheme 1.

Also, the compound represented by Formula 1 may be prepared by Reaction Scheme 4.

[Reaction Scheme 4]

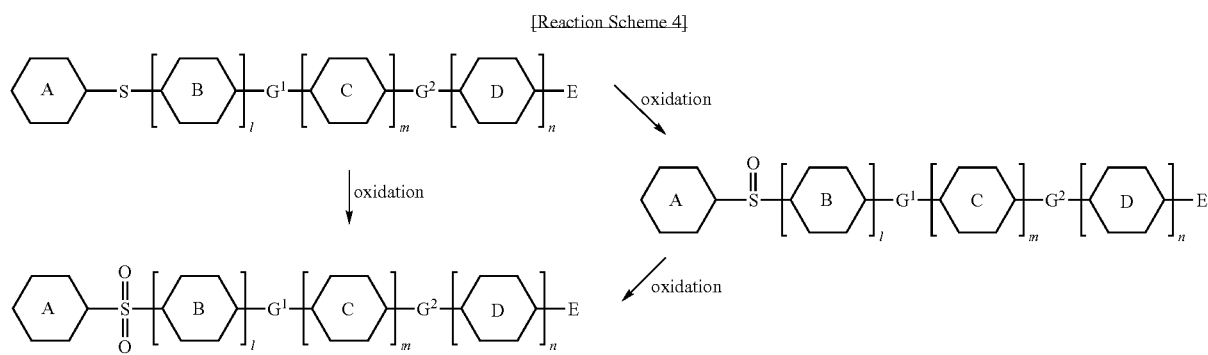

In Reaction Scheme 4, ring A, ring B, ring C, ring D, l, m, n, $G^1$, $G^2$ and E are the same as defined in Formula 1.

In Reaction Schemes 3 and 4, an aryl substitution reaction may be used to synthesize a compound in which Y=$NR^6$, O, S, etc., and an oxidation reaction may be used to introduce SO and $SO_2$.

Also, the compound represented by Formula 1 may be prepared by Reaction Scheme 5.

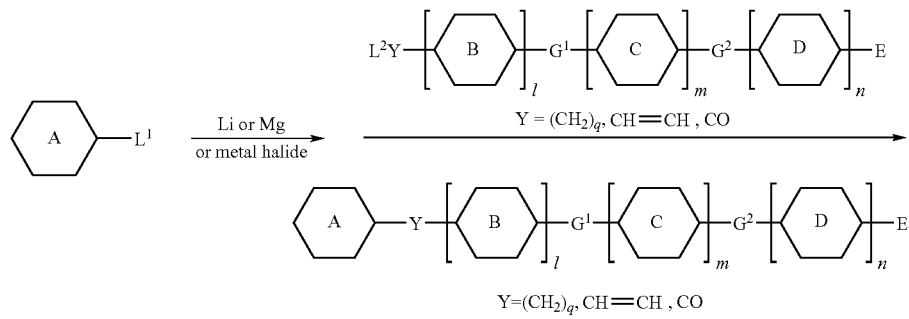

In Reaction Scheme 5, ring A, ring B, ring C, ring D, l, m, n, q, $G^1$, $G^2$ and E are the same as defined in Formula 1, each of $L^1$ and $L^2$ is the same as defined in Reaction Scheme 1, and Li or Mg represents a metal capable of forming anions, such as Li, n-BuLi, Mg, etc.

As described in Reaction Scheme 5, through a nucleophilic substitution reaction, a compound in which $Y=(CH_2)_q$, $CH=CH$, CO may be prepared.

Also, the compound represented by Formula 1 may be prepared by Reaction Scheme 6.

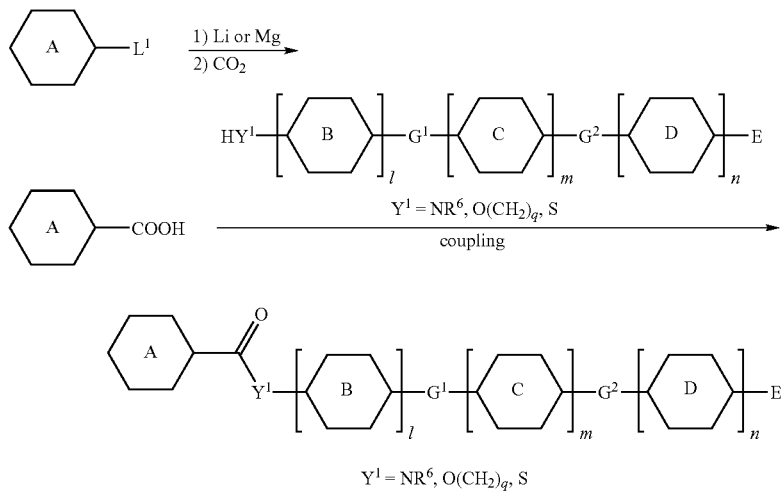

In Reaction Scheme 6, ring A, ring B, ring C, ring D, l, m, n, q, $G^1$, $G^2$, $R^6$ and E are the same as defined in Formula 1, $L^1$ is the same as defined in Reaction Scheme 1, and Li or Mg represents a metal capable of forming anions, such as Li, n-BuLi, Mg, etc.

Also, the compound represented by Formula 1 may be prepared by Reaction Scheme 7.

[Reaction Scheme 7]

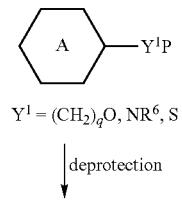

$Y^1 = (CH_2)_qO, NR^6, S$

↓ deprotection

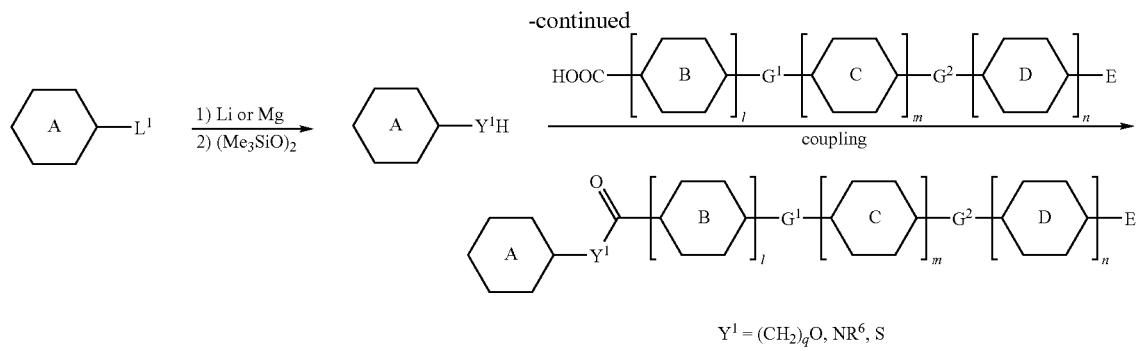

$Y^1 = (CH_2)_qO, NR^6, S$

In Reaction Scheme 7, ring A, ring B, ring C, ring D, l, m, n, q, $G^1$, $G^2$, $R^6$ and E are the same as defined in Formula 1, $L^1$ is the same as defined in Reaction Scheme 1, Li or Mg represents a metal capable of forming anions, such as Li, n-BuLi, Mg, etc., and P represents a protection group.

Based on Reaction Schemes 6 and 7, a $CO_2H$ group may be prepared by bubbling $CO_2$ gas, and an OH group may be introduced by using $(Me_3SiO)_2$. Herein, $SOCl_2$, $COCl_2$, MsCl, TsCl, EDC, DCC, etc. may be used to prepare an ester compound, or Dean-Stark may be used to carry out an esterification reaction.

In the method of preparing the compound represented by Formula 1 according to the present invention, any reactant capable of showing the same or similar effects to that of the reactant used in Reaction Schemes 1 to 7 may be used, and any preparation method having a similar scheme to that of Reaction Schemes 1 to 7 may be employed.

There is no limitation in the method of fabricating the retardation film according to the present invention, and any conventional method known in the art may be used.

As a non-limiting example, the retardation film of the present invention may be fabricated by forming a film from a mixture including the polymer resin and the compound represented by Formula 1, and then by orienting the compound represented by Formula 1 through stretching of the film. Through such a fabrication method, it is possible to easily control birefringence of the retardation film by adjusting a stretching ratio.

Also, in fabricating the retardation film according to the present invention, the mixture including the polymer resin and the compound represented by Formula 1 may further include an organic solvent as required. The inclusion of an organic solvent makes it easy to apply (coat) the mixture on a substrate.

In fabricating the retardation film according to the present invention, a solid content of the polymer resin and the compound represented by Formula 1 is included in an amount of 1 to 70 percent by weight, preferably of 2 to 50 percent by weight, and more preferably of 3 to 50 percent by weight, based on a total mixture including a solvent. If the concentration of the solid content, based on the total mixture, is less than 1 percent by weight, it is difficult to secure a film thickness, and on the other hand, if the concentration is greater than 70 percent by weight, it is difficult to obtain a film having a uniform thickness due to too high viscosity of the total mixture. Meanwhile, the compound represented by Formula 1 may be used alone or in mixture of two kinds or more thereof, and a weight ratio of the polymer resin to the compound represented by Formula 1 may range from 80:20 to 99:1, preferably 85:15 to 98:2.

Herein, as the organic solvent, conventional organic solvents known in the art may be used without any particular limitation. Non-limiting examples of the organic solvent include: hydrocarbons such as cyclohexane, cyclopentane, benzene, toluene, xylene, butylbenzene, etc.; ketones such as acetone, methyl ethyl ketone, methyl isobutyl ketone, cyclohexanone, etc.; esters such as ethyl acetate, ethylene glycol monomethyl ether acetate, propylene glycol monomethyl ether acetate, gamma-butyrolactone, etc.; amides such as 2-pyrrolidone, N-methyl-2-pyrrolidone, dimethylformamide, dimethylacetamide, etc.; halogens such as chloroform, dichloromethane, carbon tetrachloride, dichloroethane, tetrachloroethane, tetrachloroethylene, chlorobenzene, etc.; alcohols such as t-butyl alcohol, diacetone alcohol, glycerin, monoacetin, ethylene glycol, triethylene glycol, hexylene glycol, ethylene glycol monomethyl ether, etc.; phenols such as phenol, parachlorophenol, etc.; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether, dipropylene glycol diethyl ether, etc. Also, the organic solvents may be used alone or in combination, and herein, the use amount is not particularly limited.

Also, in fabricating the retardation film according to the present invention, there is no limitation in the method of forming a film by using the mixture including the polymer resin and the compound represented by Formula 1. For example, a solvent casting method or an extrusion molding method may be used. Also, the formed film is preferably a transparent film.

In using the solvent casting method, a transparent film may be fabricated by the steps of: applying the mixture on a support, such as a metal drum, a still belt, a polyester film, Teflon, etc.; drying a solvent in a drying furnace by using a roller; and releasing a film from the support. A residual solvent content in the film is generally 10 percent by weight or less, preferably 5 percent by weight or less, and more preferably 1 percent by weight or less. If the residual solvent content is greater than the upper limit, heat resistance of the film shows a tendency to decrease.

The film formed by the mixture including the polymer resin and the compound represented by Formula 1, preferably, a transparent film, may be subjected to a stretching process. Through the stretching of the film, molecules of the polymer resin are oriented, and thereby the anisotropic compound represented by Formula 1 is arranged in parallel to film plane. Herein, the arrangement may be adjusted according to the extent of stretching.

Herein, a phase difference providing property may be controlled by the kind, content, and stretching ratio of the anisotropic compound represented by Formula 1. In other words, if the film to be stretched has a uniform thickness, the absolute value of phase difference shows a tendency to increase depending on the content of the anisotropic compound or the stretching ratio. Thus, it is possible to obtain a retardation film having a required phase difference by changing the content and the stretching ratio of the anisotropic compound.

In the present invention, the anisotropic compound represented by Formula 1 has high anisotropy, and thus can show a required phase difference by film-stretching to only a small extent. Also, due to high compatibility with a polymer resin of the anisotropic compound represented by Formula 1, it is possible to fabricate a film containing a large amount of the compound represented by Formula 1. Therefore, it is easy to fabricate a retardation film having little unevenness of phase difference and uniform thickness.

An optical retardation film of the present invention may further include additional additives for improving processibility and physical properties. There is no limitation in the kinds of additives, and additives conventionally used for fabricating an optical film may be used, for example, a stress relaxing agent, a leveling agent, a UV screening agent, an antioxidant, a peeling promoter, fine particles, an infrared absorbing agent, etc.

A polarizing plate according to the present invention is characterized by including the retardation film of the present invention, and also, a liquid crystal display device according to the present invention is characterized by including the retardation film of the present invention and/or the polarizing plate of the present invention.

Other structures and fabrication methods of a polarizing and a liquid crystal display device are conventionally known in the art, and thus can be sufficiently embodied without detailed description. Thus, they are omitted in this description.

Reference will now be made in detail to the preferred embodiments of the present invention. However, the following examples are illustrative only, and the scope of the present invention is not limited thereto.

SYNTHESIS EXAMPLE 1

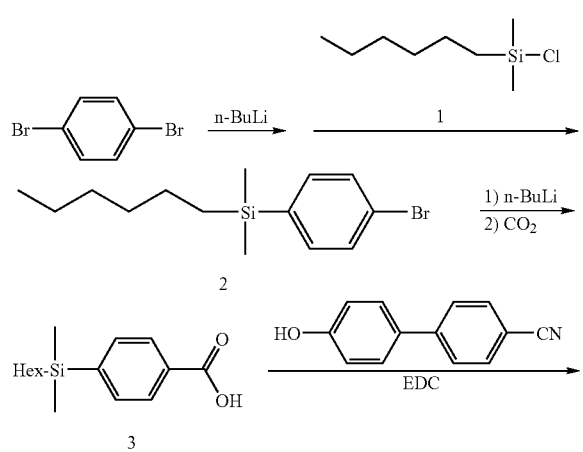

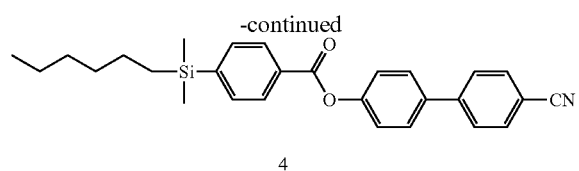

1,4-Dibromobenzene was dissolved in an anhydrous THF solvent, and 1.0 equivalent of n-BuLi was gradually added at −78° C., followed by stirring at low temperatures for about 2 hours to generate anions. Then, 1.05 equivalents of a compound 1 was dropwise added thereto. After the completion of the addition, the temperature was gradually raised up to room temperature, followed by stirring at room temperature for about 2 hours. After the completion of the reaction, the mixture was worked up with hexane and water, and purified via silica gel to obtain a compound 2 at a yield of 95%.

The compound 2 was dissolved in an anhydrous THF solvent, and 1.05 equivalents of n-BuLi was gradually added at −78° C., followed by stirring at low temperatures for about 2 hours to generate anions. Then, excess $CO_2$ was bubbled, and after the completion of the reaction, 10% HCl was used to adjust pH to about 3. The mixture was worked up with ether and water, and purified via silica gel to obtain a compound 3 at a yield of 80%.

The compound 3 and 4-cyano-4'-hydroxybiphenyl were dissolved in $CH_2Cl_2$, and 1.1 equivalents of EDC and 0.1 equivalents of DMAP were added thereto, followed by stirring at room temperature for about 10 hours. After the completion of the reaction, the mixture was worked up with $CH_2Cl_2$, and recrystallized in hexane to obtain a final compound 4 at a yield of 85% or more. $^1$HNMR of the compound 4 is as follows.

$^1$HNMR (400 MHz, $CDCl_3$): δ 0.30 (s, 6H), 0.69~0.81 (m, 2H), 0.85~0.93 (m, 3H), 1.20~1.39 (m, 8H), 7.62 (d, 2H), 7.35 (d, 2H), 7.67 (d, 2H), 7.70 (d, 2H), 7.74 (d, 2H), 8.17 (d, 2H).

SYNTHESIS EXAMPLE 2

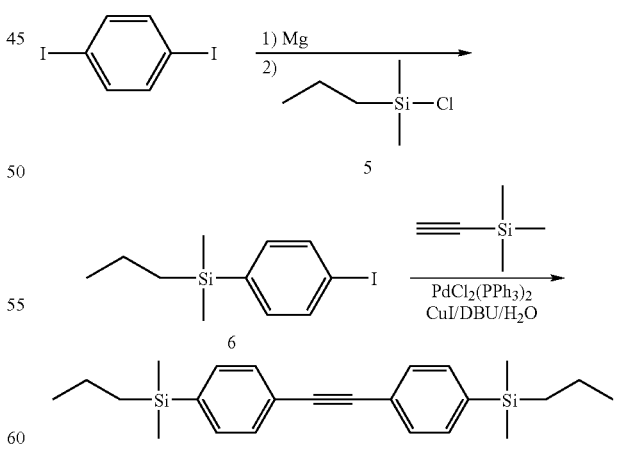

1,4-Diiodobenzene was dissolved in an anhydrous THF solvent, and 1.0 equivalent of n-BuLi was gradually added at −78° C., followed by stirring at low temperatures for about 2 hours to generate anions. Then, 1.05 equivalents of a compound 5 was added dropwise thereto. After the completion of the addition, the temperature was gradually raised up to room temperature, followed by stirring at room temperature for about 2 hours. After the completion of the reaction, the mixture was worked up with hexane and water, and purified via silica gel to obtain a compound 6 at a yield of 92%.

The compound 6 was dissolved in benzene, and 0.1 equivalents of CuI, 0.03 equivalents of PdCl$_2$(PPh$_3$)$_2$, 5.0 equivalents of DBU, 0.5 equivalents of trimethylsilyl acetylene and 0.4 equivalents of H$_2$O were added, followed by stirring at 60° C. for about 10 hours. After the completion of the reaction, the mixture was worked up with 10% HCl and ether, and purified via silica gel to obtain a final compound 7 at a yield of 83%. $^1$HNMR of the compound 7 is as follows.

$^1$HNMR (400 MHz, CDCl$_3$): δ 0.31 (s, 12H), 0.69~0.80 (m, 4H), 0.86~0.92 (m, 6H), 1.62~1.71 (m, 4H), 7.45~7.54 (m, 8H).

SYNTHESIS EXAMPLE 3

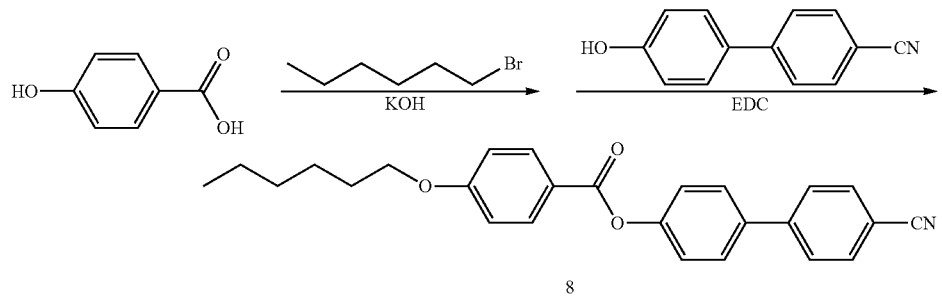

1.0 equivalent of p-Hydroxybenzoic acid was dissolved in a mixed solvent (ethanol: water=7:3), and 1.0 equivalent of bromohexane and 2.2 equivalents of KOH were added, followed by stirring at 90° C. for about 10 hours. Then, ethanol was distilled under reduced pressure, and 10% HCl(aq) was gradually added to adjust pH to 1 to 3. Then, the resultant solid was subjected to filtration and drying, and the dried resultant product, together with 1.0 equivalent of 4-cyano-4'-hydroxybiphenyl, was dissolved in CH$_2$Cl$_2$. 1.1 equivalents of EDC and 0.1 equivalents of DMAP were added thereto, and stirring was carried out at room temperature for about 10 hours. After the completion of the reaction, the mixture was worked up with CH$_2$Cl$_2$, and purified via silica gel to obtain a final compound 8.

SYNTHESIS EXAMPLE 4

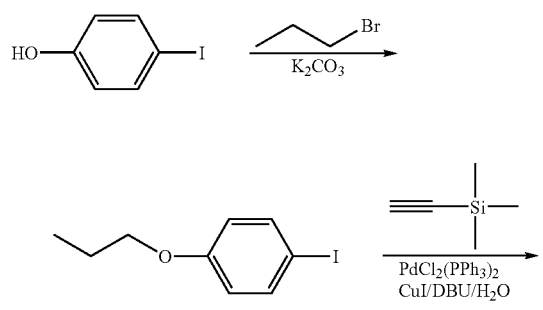

p-Iodophenol and Bromopropane (with the same equivalents) were dissolved in 1,4-dioxane, and was subjected to an alkylation reaction by K$_2$CO$_3$ base. Then, a compound 9 was prepared by a Pd coupling reaction of Synthesis Example 2.

EXAMPLE 1

100 parts by weight of cellulose triacetate (degree of acetyl substitution of 2.88), 6 parts by weight of triphenylphosphate, and 2.5 parts by weight of anisotropic compound obtained from Synthesis Example 1 were dissolved in 700 parts by weight of methylene chloride to provide a mixture, and the mixture was applied to a glass substrate so as to obtain a film by a casting method. After a drying process at 130° C. for 1 hour, a residual solvent was removed, and then the film was released from the glass substrate and cut into desired size pieces. At 135° C., the film was stretched with stretching ratio of 1.4. The film was a transparent film having a uniform thickness of 70 μm, and no unevenness of phase difference.

EXAMPLE 2

A retardation film was fabricated in the same manner as described in Example 1, except that 5 parts by weight of anisotropic compound obtained from Synthesis Example 1 was used.

A stretched film was a transparent film having a uniform thickness, and no unevenness of phase difference.

EXAMPLE 3

A retardation film was fabricated in the same manner as described in Example 1, except that the anisotropic compound obtained from Synthesis Example 2, instead of the anisotropic compound obtained from Synthesis Example 1, was used.

A stretched film was a transparent film having a uniform thickness, and no unevenness of phase difference.

COMPARATIVE EXAMPLE 1

A retardation film was fabricated in the same manner as described in Example 1, except that the anisotropic compound obtained from Synthesis Example 1 was not used.

A stretched film was a transparent film having a uniform thickness, and no unevenness of phase difference.

COMPARATIVE EXAMPLE 2

A retardation film was fabricated in the same manner as described in Example 1, except that the anisotropic compound obtained from Synthesis Example 1 was not used, and the film was stretched with stretching ratio of 1.8. Through solution casting, the film was controlled to have a thickness of 70 μm after stretching.

A thickness of a stretched film was 70 μm, but was not uniform. Also, the film had unevenness of phase difference.

COMPARATIVE EXAMPLE 3

A retardation film was fabricated in the same manner as described in Example 1, except that 4-methyl phenyl benzoate, instead of the anisotropic compound obtained from Synthesis Example 1, was used.

A stretched film was a transparent film having a uniform thickness, and no unevenness of phase difference.

COMPARATIVE EXAMPLE 4

A retardation film was fabricated in the same manner as described in Example 2, except that the anisotropic compound obtained from Synthesis Example 3, instead of the anisotropic compound obtained from Synthesis Example 1, was used.

A stretched film was not transparent, and on the surface of it, deposition was observed.

COMPARATIVE EXAMPLE 5

A retardation film was fabricated in the same manner as described in Example 2, except that the anisotropic compound obtained from Synthesis Example 4, instead of the anisotropic compound obtained from Synthesis Example 1, was used.

A stretched film was not transparent, and on the surface of it, deposition was observed.

Test Result

On each of the retardation films obtained from Examples 1 to 3 and Comparative Examples 1 to 5, an intra-planar phase difference value (Re), and a thickness-directional phase difference value (Rth) were measured by using a phase difference meter (axoscan, commercially available from Axometrics). Table 1 shows the results.

The intra-planar phase difference value (Re) and the thickness-directional phase difference value (Rth) are defined by following equations. Herein, $n_x$ and $n_y$ represent intra-planar refractive indexes, $n_z$ represents a thickness-directional refractive index, and d represents a film thickness (nm).

$$Re = (n_x - n_y) \times d$$

$$Rth = ((n_x + n_y)/2 - n_z) \times d$$

TABLE 1

|  | Re | Rth |
|---|---|---|
| Exp. 1 | 76 | 172 |
| Exp. 2 | 133 | 251 |
| Exp. 3 | 80 | 185 |
| Comp. Exp. 1 | 35 | 78 |

TABLE 1-continued

|  | Re | Rth |
|---|---|---|
| Comp. Exp. 2 | 83 | 159 |
| Comp. Exp. 3 | 46 | 111 |

As shown in the results from Examples 1 to 3 and Comparative Examples 1 to 5, it can be seen that the film (Example 1) containing the anisotropic compound represented by Formula 1 of the present invention and a polymer resin can show a very large phase difference by stretching a film to only a small extent, as compared to the film (Comparative Example 1) containing only a polymer resin without the anisotropic compound.

Also, as can be seen from the result of Comparative Example 3, in compounds having low anisotropy, an anisotropy improving effect through polymer-stretching is generally insignificant.

Also, as can be seen from the results of Comparative Examples 4 and 5, an anisotropic material not containing a silicon group is difficult to fabricate a transparent film due to its low compatibility with a polymer resin, and its low solubility in a solvent.

While this invention has been described in connection with what is presently considered to be the most practical and preferred embodiment, it is to be understood that the invention is not limited to the disclosed embodiment. On the contrary, it is intended to cover various modifications and variations within the spirit and scope of the appended claims.

What is claimed is:
1. A retardation film comprising:
   (a) a polymer resin; and
   (b) a silicon-containing compound represented by Formula 1,

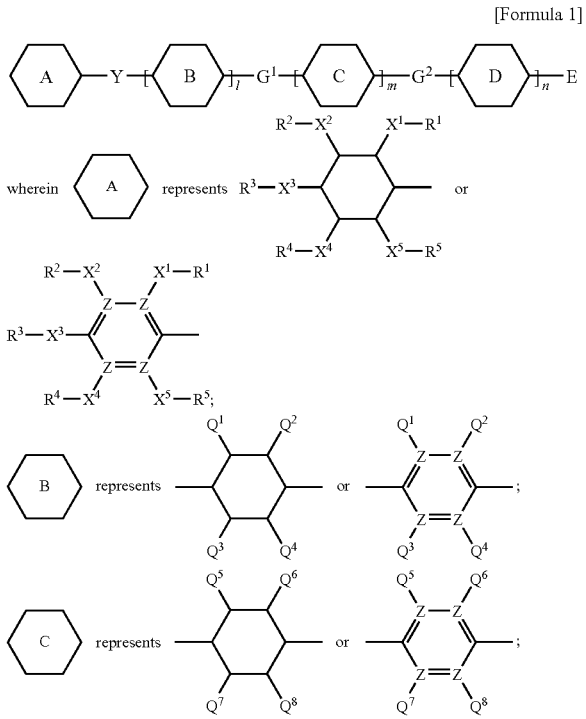

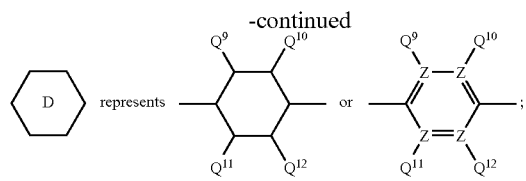

each of $Q^1$ to $Q^{12}$ independently represents —H, —F, —Cl, —Br, —I, —CN, —CF$_3$, —OCF$_3$, —R$^6$, —OR$^6$, —NHR$^6$, —NR$^6$R$^6$, or —C(=O)R$^6$;

Z represents C or N, and herein, there exist bonds with corresponding $Q^1$ to $Q^{12}$ with the proviso that Z≠N;

each of l, m and n independently represents an integer of 0 to 2, and l+m+n represents an integer of at least 1;

each of Y, $G^1$ and $G^2$ independently represents —(CH$_2$)$_r$SiW$^1$W$^2$(CH$_2$)$_s$—, —O—, —NR$^6$—, —S—, —SO—, —SO$_2$—, —(CH$_2$)$_q$—, —CH=CH—, —C≡C—, C(=O)O(CH$_2$)$_q$—, —OC(=O)(CH$_2$)$_q$—, (CH$_2$)$_q$C(=O)O—, —(CH$_2$)$_q$OC(=O)—, —C(=O)—, —C(=O)(CH$_2$)$_q$—, —(CH$_2$)$_q$C(=O)—, —C(=O)NR$^6$—, —NR$^6$C(O)—, —C(=O)S—, or —SC(=O)—, q represents an integer of 0 to 5, each of r and s independently represents an integer of 0 to 2;

E represents —H, —F, —Cl, —Br, —I, —CN, —NCO, —NCS, —SiW$^1$W$^2$R$^6$, —R$^6$, —N(R$^6$)$_2$, —OR$^6$, —CF$_3$, or —OCF$_3$;

each of $X^1$ to $X^5$ independently represents —SiW$^1$W$^2$—, —O—, —NR$^6$—, —S—, —SO—, —SO$_2$—, —(CH$_2$)$_p$—, —C(=O)NR$^6$—, —NR$^6$C(=O)—, —NR$^6$C(=O)NR$^6$—, —C(=O)O—, —OC(=O)—, or —OC(=OC)O—, and p represents an integer of 0 to 2;

$W^1$ represents —R$^7$, —OR$^7$, —NHR$^7$, or —N(R$^7$)$_2$;

$W^2$ represents —R$^8$, —OR$^8$, —NHR$^8$, or —N(R$^8$)$_2$;

each of $R^1$ to $R^8$ independently represents —H, C$_1$~C$_{20}$alkyl, C$_1$~C$_{20}$fluoroalkyl, C$_2$~C$_{20}$alkynyl, C$_2$~C$_{20}$fluoroalkynyl, —(CH$_2$CH$_2$O)$_t$CH$_3$, —(CH$_2$CHCH$_3$O)$_t$CH$_3$, or —(CHCH$_3$CH$_2$O)$_t$CH$_3$, and t represents an integer of 1 to 5; and at least one of Y, $G^1$, $G^2$, E, and $X^1$ to $X^5$ is a Si containing substituent, and herein, as the Si containing substituent, in Y, $G^1$ and $G^2$, —(CH$_2$)$_r$SiW$^1$W$^2$(CH$_2$)$_s$— is introduced, in E, —SiW$^1$W$^2$R$^6$ is introduced, and in $X^1$ to $X^5$, —SiW$^1$W$^2$— is introduced.

2. The retardation film as claimed in claim 1, wherein the polymer resin is at least one material selected from the group including an alicyclic structure-containing polymer resin, a polycarbonate resin, a polyester resin, a polysulfone resin, a polyethersulfone resin, a polyetherketone resin, a polystyrene resin, a polyolefin resin, a polyvinylalcohol resin, a polyvinyl chloride resin, a polyacryl resin, a cellulose acetate resin, a polyimide resin, a polyamide resin, a polyketonesulfide resin, a polyarylenesulfide resin, a polyaryleneether resin, a polyacetal resin, and a cellulose resin.

3. The retardation film as claimed in claim 1, wherein the compound represented by Formula 1 has a refractive anisotropy of 0.2 or more.

4. The retardation film as claimed in claim 1, wherein in the compound represented by Formula 1, the l+m+n is an integer of 1 to 3.

5. The retardation film as claimed in claim 1, wherein in the compound represented by Formula 1, a mesogen between Y and E has a structure composed of [aromatic ring]-[single bond, double bond or triple bond]-[aromatic ring].

6. The retardation film as claimed in claim 1, wherein a weight ratio of the polymer resin to the compound represented by Formula 1 ranges from 80:20 to 99:1.

7. The retardation film as claimed in claim 1, which has a intra-planar phase difference value (Re) ranging from 10 to 500 nm measured at a light wavelength of 550 nm, and a thickness-directional phase difference value (Rth) ranging from 10 to 500 nm measured at a light wavelength of 550 nm.

8. The retardation film as claimed in claim 1, which is obtained by forming a film from a mixture comprising the polymer resin and the compound represented by Formula 1, and orienting the compound represented by Formula 1 through stretching of the film.

9. The retardation film as claimed in claim 1, further comprising at least one selected from the group including a stress relaxing agent, a leveling agent, a UV screening agent, an antioxidant, a peeling promoter, fine particles and an infrared absorbing agent.

10. A polarizing plate comprising a retardation film, the retardation film comprising: (a) a polymer resin; and (b) a silicon-containing compound represented by Formula 1,

[Formula 1]

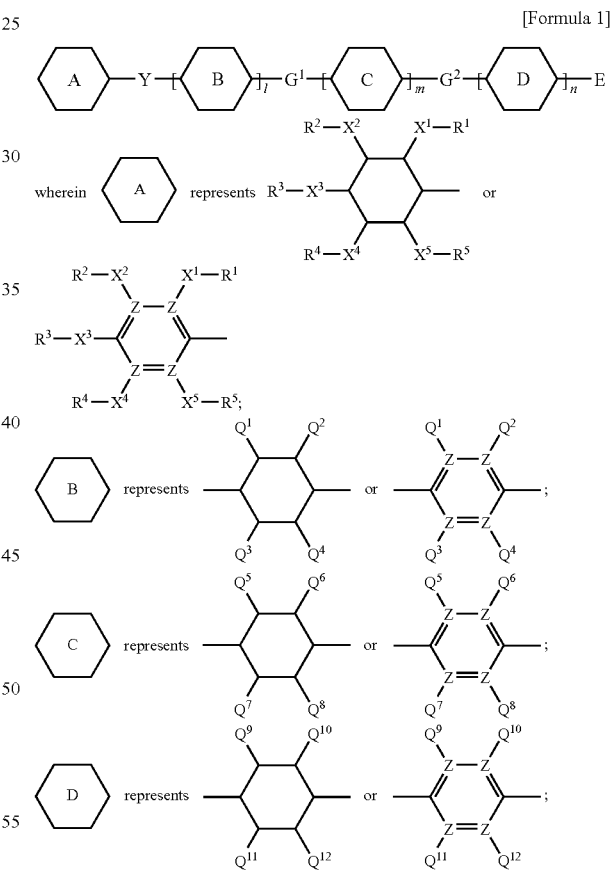

each of $Q^1$ to $Q^{12}$ independently represents —H, —F, —Cl, —Br, —I, —CN, —CF$_3$, —OCF$_3$, —R$^6$, —OR$^6$, —NHR$^6$, —NR$^6$R$^6$, —C(=O)R$^6$;

Z represents C or N, and herein, there exist bonds with corresponding $Q^1$ to $Q^{12}$ with the proviso that Z≠N;

each of l, m and n independently represents an integer of 0 to 2, and l+m+n represents an integer of at least 1;

each of Y, $G^1$ and $G^2$ independently represents —(CH$_2$)$_r$SiW$^1$W$^2$(CH$_2$)$_s$—, —O—, —NR$^6$—,

23

—S—, —SO—, —SO$_2$—, —(CH$_2$)$_q$—, —CH=CH—, —C≡C—, —C(=O)O(CH$_2$)$_q$—, —OC(=O)(CH$_2$)$_q$—, (CH$_2$)$_q$C(=O)O—, —(CH$_2$)$_q$OC(=O)—, —C(=O)—, —C(=O)(CH$_2$)$_q$—, —(CH$_2$)$_q$C(=O)—, —C(=O)NR$^6$—, —NR$^6$C(=O)—, —C(=O)S—, or —SC(=O)—, q represents an integer of 0 to 5, each of r and s independently represents an integer of 0 to 2;

E represents —H, —F, —Cl, —Br, —I, —CN, —NCO, —NCS, —SiW$^1$W$^2$R$^6$, —R$^6$, —N(R$^6$)$_2$, —OR$^6$, —CF$_3$, or —OCF$_3$;

each of X$^1$ to X$^5$ independently represents —SiW$^1$W$^2$—, —O—, —NR$^6$—, —S—, —SO—, —SO$_2$—, —(CH$_2$)$_p$—, —C(=O)NR$^6$—, —NR$^6$C(=O)—, —NR$^6$C(=O)NR$^6$—, —C(=O)O—, —OC(=O)—, or —OC(=O)O—, and p represents an integer of 0 to 2;

W$^1$ represents —R$^7$, —OR$^7$, —NHR$^7$, or —N(R$^7$)$_2$;

W$^2$ represents —R$^8$, —OR$^8$, —NHR$^8$, or —N(R$^8$)$_2$;

each of R$^1$ to R$^8$ independently represents —H, C$_1$~C$_{20}$alkyl, C$_1$-C$_{20}$fluoralkyl, C$_2$~C$_{20}$alkynyl, C$_2$~C$_{20}$fluoroalkynyl, —(CH$_2$CH$_2$O)$_t$, —CH$_2$CHCH$_3$O, CH$_3$, or —(CHCH$_3$CH$_2$O)$_t$CH$_3$, t represents an integer of 1 to 5; and at least one of Y, G$^1$, G$^2$, E, and X$^1$ to X$^5$ is a Si containing substituent, and herein, as the Si containing substituent, in Y, G$^1$ and G$^2$, —(CH$_2$)$_r$SiW$^1$W$^2$(CH$_2$)$_s$— is introduced, in E, —SiW$^1$W$^2$R$^6$ is introduced, and in X$^1$ to X$^5$, —Si$^1$W$^2$— is introduced.

11. The polarizing plate as claimed in claim 10, wherein the polymer resin is at least one material selected from the group including an alicyclic structure-containing polymer resin, a polycarbonate resin, a polyester resin, a polysulfone resin, a polyethersulfone resin, a polyetherketone resin, a polystyrene resin, a polyblefin resin, a polyvinylalcohol resin, a polyvinyl chloride resin, a polyacryl resin, a cellulose acetate resin, a polyimide resin, a polyamide resin, a polyketonesulfide resin, a polyarylenesulfide resin, a polyaryleneether resin, a polyacetal resin, and a cellulose resin.

12. The polarizing plate as claimed in claim 10, wherein the compound represented by Formula 1 has a refractive anisotropy of 0.2 or more.

13. The polarizing plate as claimed in claim 10, wherein in the compound represented by Formula 1, the l+m+n is an integer of 1 to 3.

14. The polarizing plate as claimed in claim 10, wherein in the compound represented by Formula 1, a mesogen between Y and E has a structure composed of [aromatic ring]-[single bond, double bond or triple bond]-[aromatic ring].

15. A liquid crystal display device comprising one or both of (i) a retardation film and (ii) a polarizing plate including the retardation film, the retardation film comprising (a) a polymer resin and (b) a silicon-containing compound represented by Formula 1,

[Formula 1]

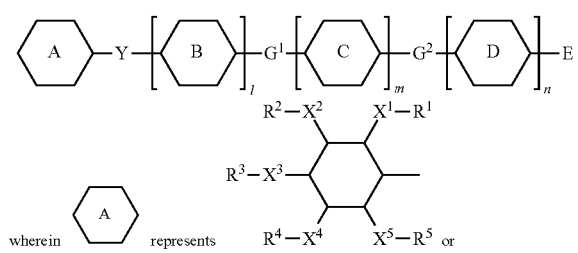

24

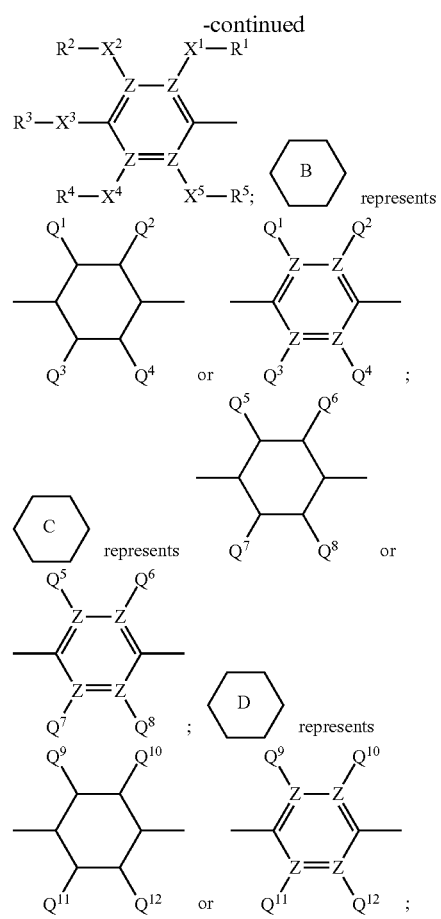

each of Q$^1$ to Q$^{12}$ independently represents —H, —F, —Cl, —Br, —I, —CN, —CF$_3$, —OCF$_3$, —R$^6$, —OR$^6$, —NHR$^6$, —NR$^6$R$^6$, or —C(=O)R$^6$;

Z represents C or N, and herein, there exist bonds with corresponding Q$^1$ to Q$^{12}$ with the proviso that Z≠N;

each of l, m and n independently represents an integer of 0 to 2, and l+m+n represents an integer of at least 1;

each of Y, G$^1$ and G$^2$ independently represents —(CH$_2$)$_r$SiW$^1$W$^2$(CH$_2$)$_s$—, —O—, —NR$^6$—, —S—, —SO—, —SO$_2$—, —(CH$_2$)$_q$—, —CH=CH—, —C≡C—, —C(=O)O(CH$_2$)$_q$—, —OC(=O)(CH$_2$)$_q$—, (CH$_2$)$_q$C(=O)O—, —(CH$_2$)$_q$OC(=O)—, —C(=O)—, —C(CH$_2$)$_q$—, —(CH$_2$)$_q$C(=O)—, —C(=O)NR$^6$—, —NR$^6$C(=O)—, —C(=O)S—, or —SC(=O)—, q represents an integer of 0 to 5, each of r and s independently represents an integer of 0 to 2;

E represents —H, —F, —Cl, —Br, —I, —CN, —NCO, —NCS, —SiW$^1$W$^2$R$^6$, —R$^6$, —N(R$^6$)$_2$, —OR$^6$, —CF$_3$, or —OCF$_3$;

each of X$^1$ to X$^5$ independently represents —SiW$^1$W$^2$—, —O—, —NR$^6$—, —S—, —SO—, —(CH$_2$)$_p$—, —C(=O)NR$^6$—, —NR$^6$C(=O)NR$^6$—, —C(=O)O—, —OC(=O)—, or —OC(=O)O—, and p represents an integer of 0 to 2;

W$^1$ represents —R$^7$, —OR$^7$, —NHR$^7$, or —N(R$^7$)$_2$;

W$^2$ represents —R$^8$, —OR$^8$, —NHR$^8$, or —N(R$^8$)$_2$;

each of R$^1$ to R$^8$ independently represents —H, C$_1$~C$_{20}$alkyl, C$_1$-C$_{20}$fluoralkyl, C$_2$~C$_{20}$alkynyl, C$_2$~C$_{20}$fluoroalkynyl, —(CH$_2$CH$_2$O)$_1$CH$_3$, —(CH$_2$CHCH$_3$O)$_1$CH$_3$, or —(CHCH$_3$CH$_2$O)$_1$CH$_3$, and t represents an integer of 1 to 5; and at least one of Y, $G^1$, $G^2$, E, and $X^1$ to $X^5$ is a Si containing substituent, and herein, as the Si containing substituent, in Y, $G^1$ and $G^2$, $-(CH_2)_rSiW^1W^2(CH_2)_s-$ is introduced, in E, $-SiW^1W^2R^6-$ is introduced.

16. The liquid crystal display device as claimed in claim 15, wherein the polymer resin is at least one material selected from the group including an alicyclic structure-containing polymer resin, a polycarbonate resin, a polyester resin, a polysulfone resin, a polyethersulfone resin, a polyetherketone resin, a polystyrene resin, a polyolefin resin, a polyvinylalcohol resin, a polyvinyl chloride resin, a polyacryl resin, a cellulose acetate resin, a polyimide resin, a polyamide resin, a polyketonesulfide resin, a polyarylenesulfide resin, a polyaryleneether resin, a polyacetal resin, and a cellulose resin.

17. The liquid crystal display device as claimed in claim 15, wherein the compound represented by Formula 1 has a refractive anisotropy of 0.2 or more.

18. The liquid crystal display device as claimed in claim 15, wherein in the compound represented by Formula 1, the l+m+n is an integer of 1 to 3.

19. The liquid crystal display device as claimed in claim 15, wherein in the compound represented by Formula 1, a mesogen between Y and E has a structure composed of [aromatic ring]-[single bond, double bond or triple bond]-[aromatic ring].

* * * * *